Inventor
Julius Leffert
By Clarence A. O'Brien
Attorney

July 19, 1932.  J. LEFFERT  1,868,392
HELICOPTER
Filed April 15, 1931  7 Sheets-Sheet 3

Inventor
Julius Leffert
By Clarence A. O'Brien
Attorney

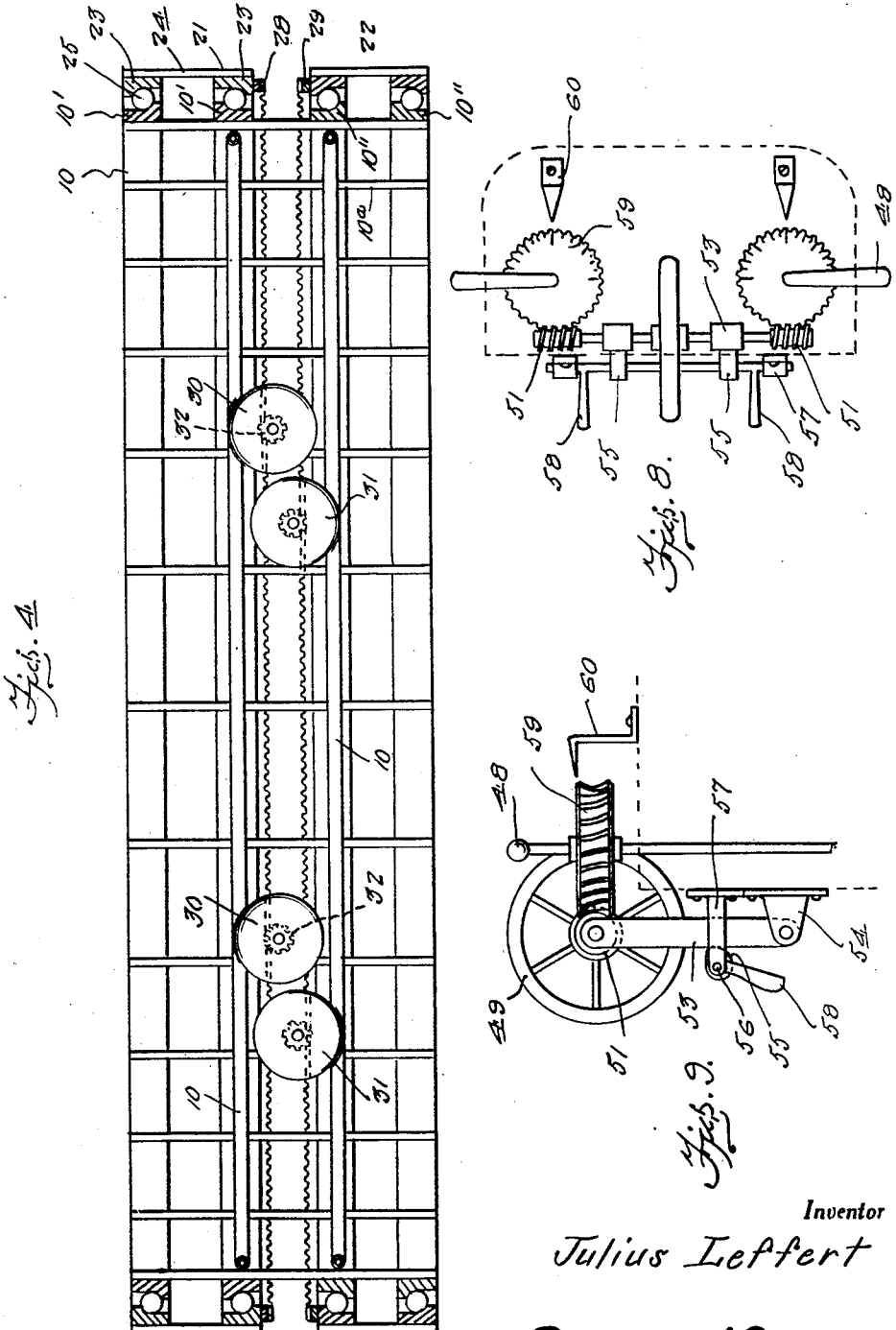

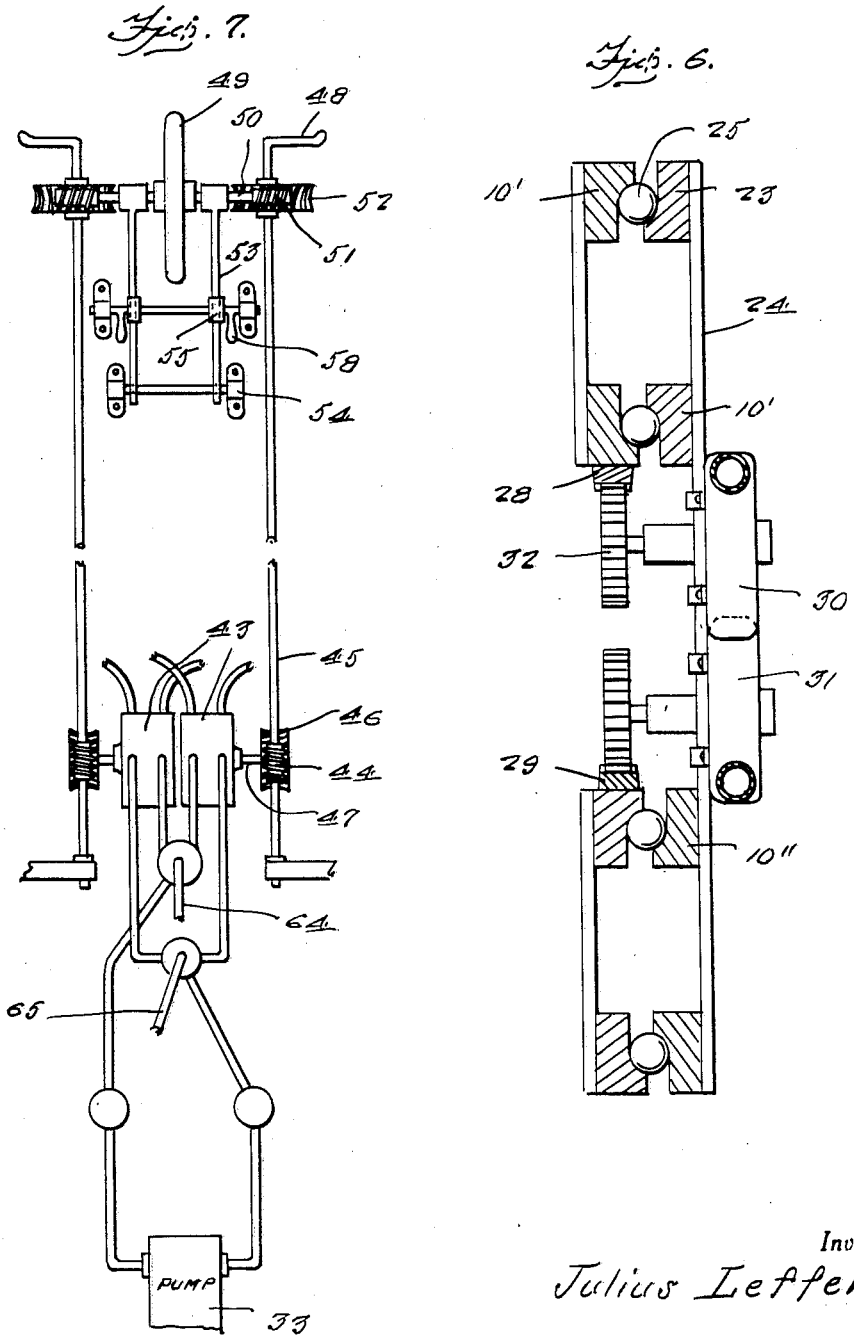

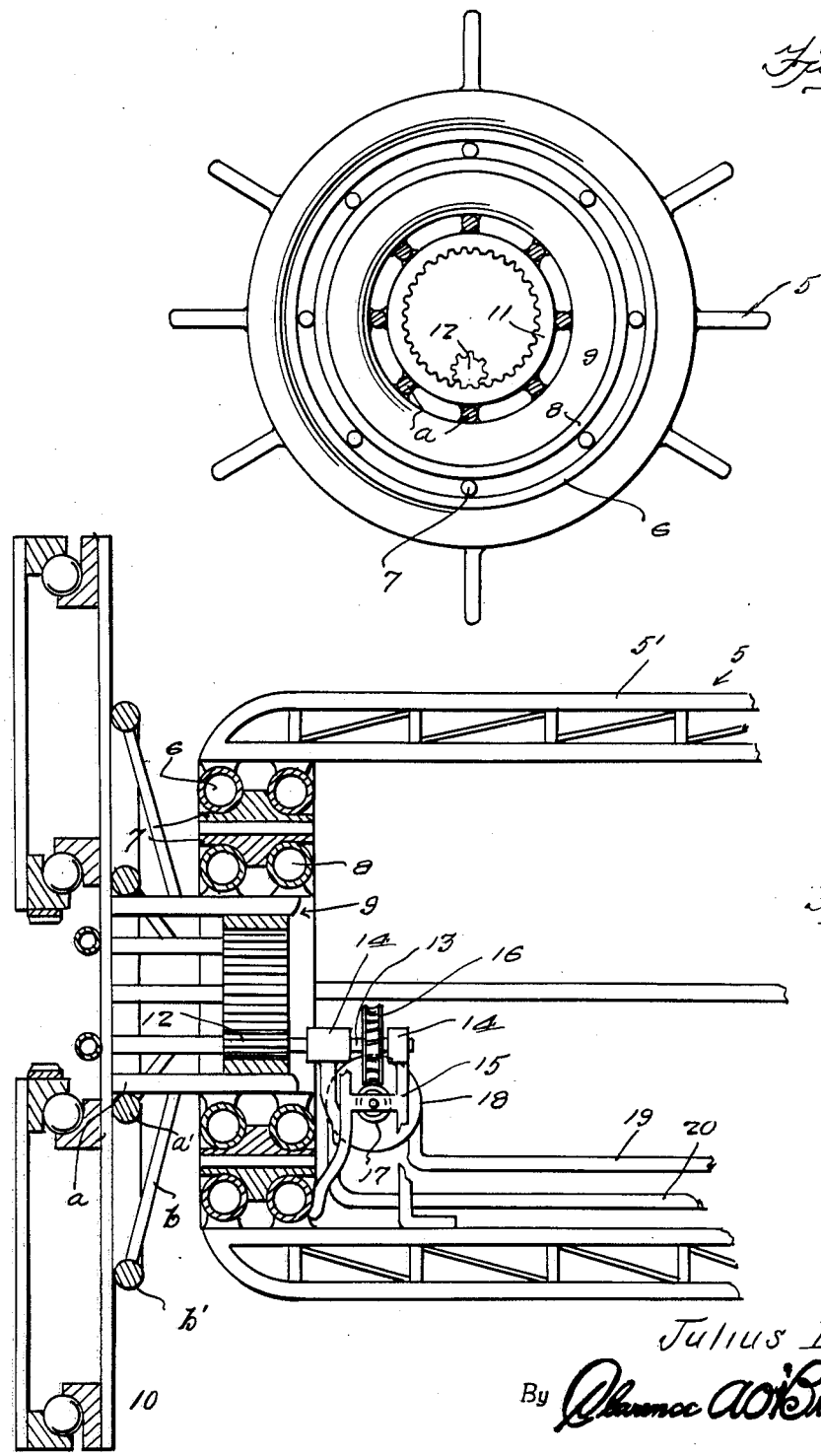

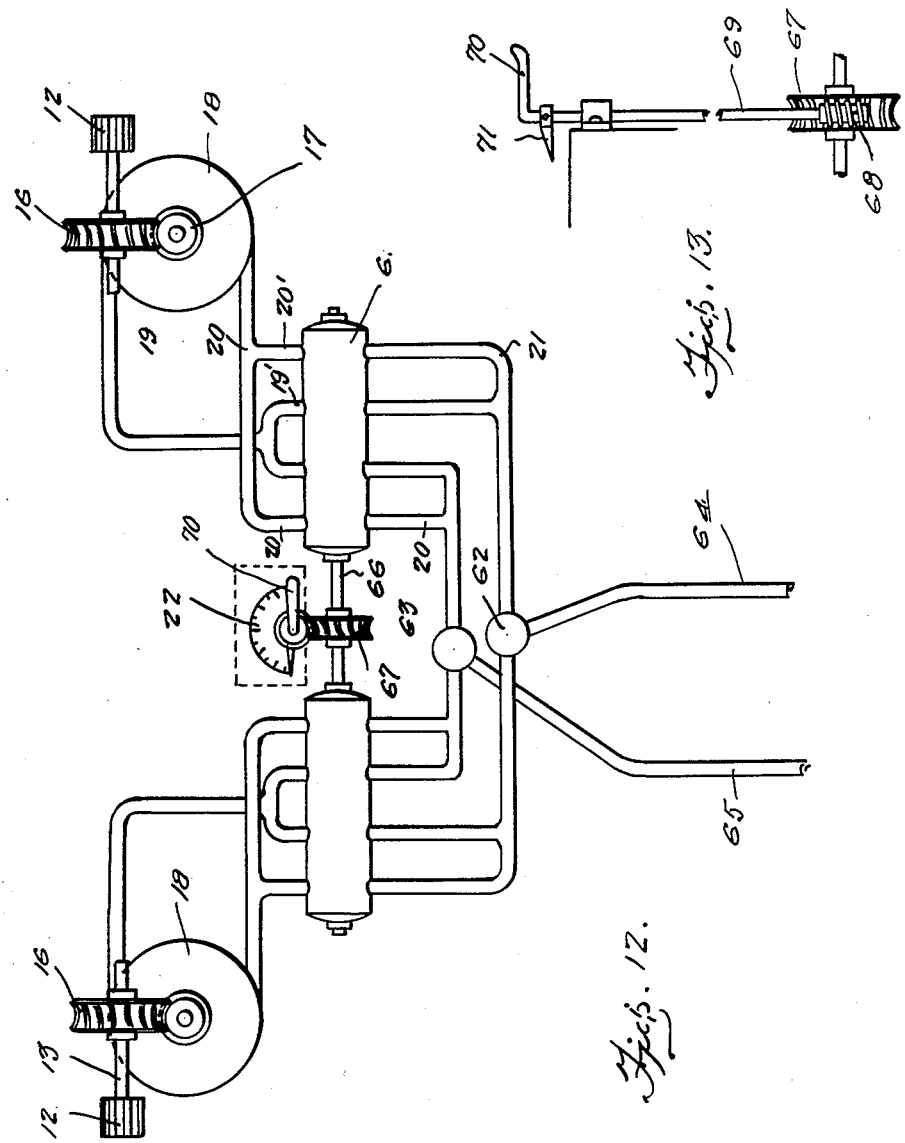

Patented July 19, 1932

1,868,392

UNITED STATES PATENT OFFICE

JULIUS LEFFERT, OF HILLSBORO, MISSOURI, ASSIGNOR OF ONE-HALF TO HERBERT A. SPRECKELMEYER, OF ST. LOUIS, MISSOURI

HELICOPTER

Application filed April 15, 1931. Serial No. 530,376.

This invention relates to an aircraft of the helicopter type, the general object of the invention being to provide a fuselage having a supporting ring passing around the same supported for rocking movement about a horizontal axis carried by the fuselage, said ring supporting upper and lower rotary rings to which a plurality of blades are attached, the blades of the lower ring being shorter than those of the upper ring, with power means for rotating the upper and lower rings, and with power means for rocking the supporting ring on its pivot to guide and propel the ship.

Another object of the invention is to provide turbines for actuating the rotary rings, and for tilting the supporting ring, with manually controlled means for regulating the flow of fluid to the turbines so as to operate the rotary rings at various speeds as desired as well as to provide means to rotate one ring faster than the other when desired or to operate both rings at the same speed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like numerals denote like or corresponding parts throughout the several views, and in which:—

Fig. 4 is a vertical sectional view through the supporting and rotary rings and showing how the turbine acts to rotate the rotary rings.

Fig. 6 is a vertical sectional view showing the supporting ring and the two rotary rings with the turbines and their gears engaging the racks of the rotary rings.

Fig. 7 is a view showing the means for controlling the flow of fluid to the turbines which rotate the blade carrying rings.

Fig. 8 is a top plan view of Fig. 7.

Fig. 9 is a side view of Fig. 8.

Fig. 10 is an elevation of the means for tilting the supporting ring.

Fig. 11 is a vertical sectional view through Fig. 10.

Fig. 12 is a diagrammatic view showing the means for controlling the flow of fluid to the turbines which tilt the supporting ring.

Fig. 13 is a detail sectional view of Fig. 12, which shows the manually operated control means for the valve members, which control the flow of fluid to the turbine for tilting the supporting ring.

Figure 1:
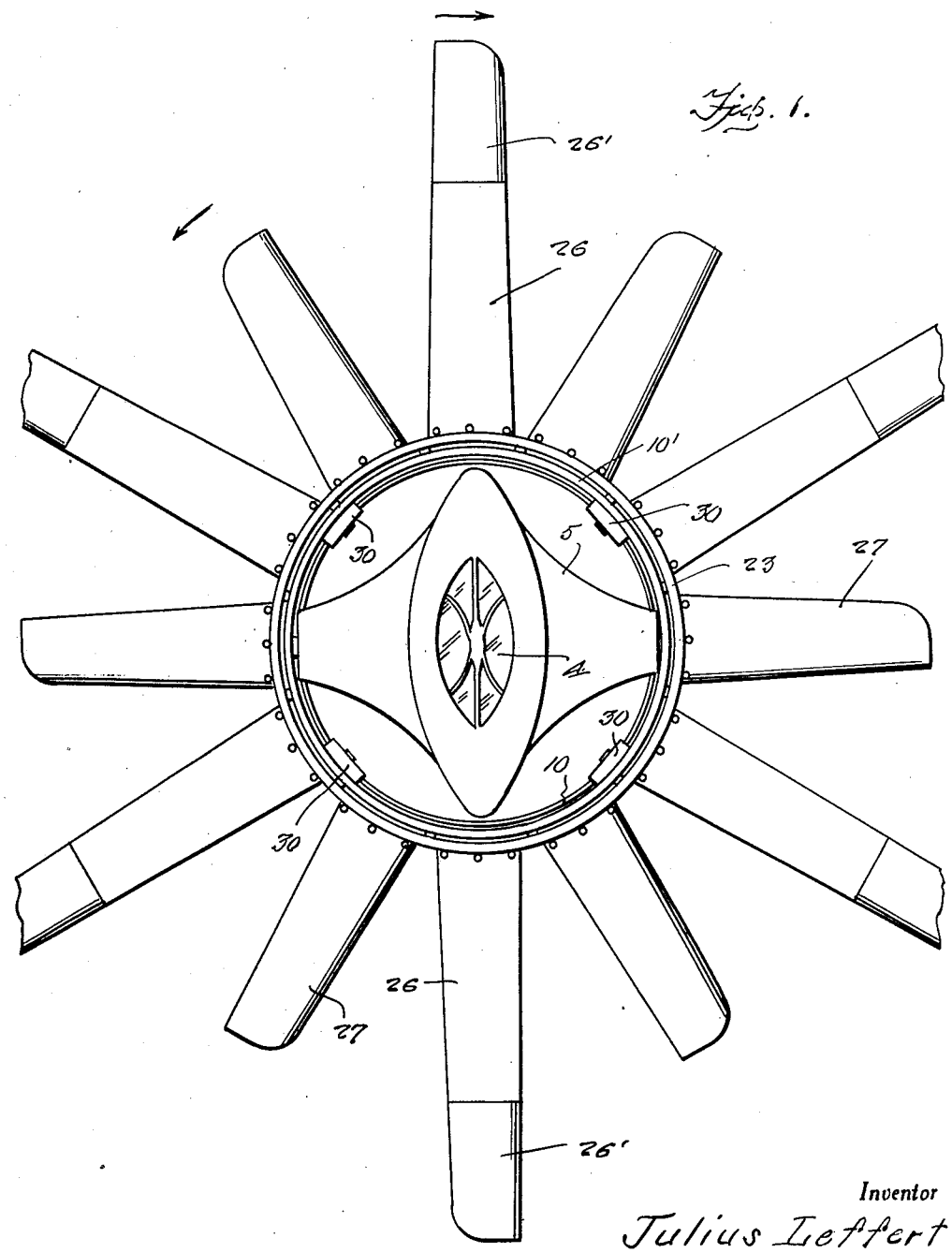
Figure 1 is a plan view of the craft.
Figure 2:
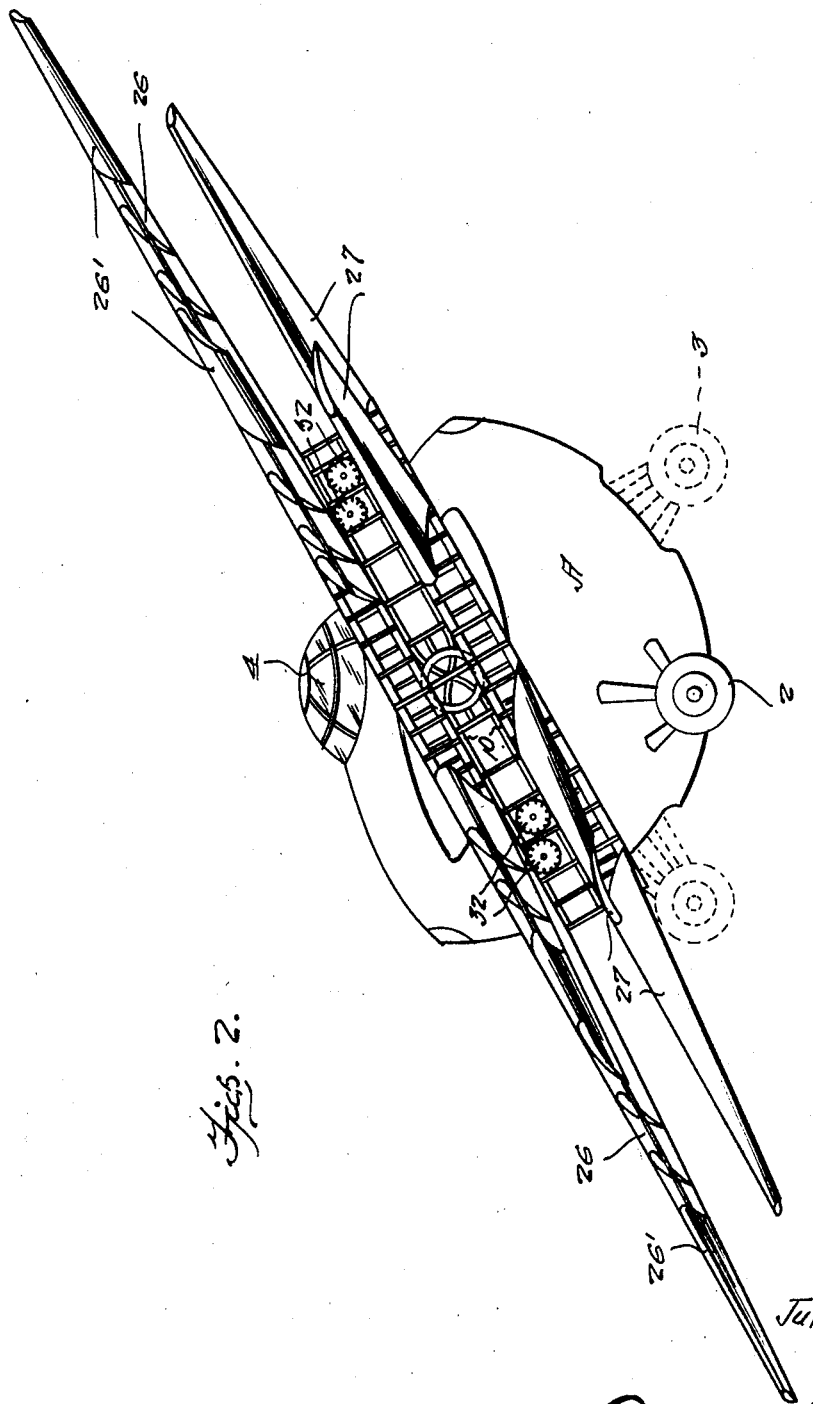
Fig. 2 is a side view.

In these drawings, the letter A indicates the fuselage which is preferably of the shape shown and is provided with a landing wheel 2 at each side thereof and with front and rear landing wheels 3 which are so arranged that they can be drawn into the fuselage when the craft is in flight.

A dome 4 is arranged in the top of the fuselage and is formed in part of transparent material so as to provide vision for the pilot and if desired, this dome can be made removable so as to provide an entrance and exit for the pilot and passengers. A trunnion carrying frame 5 extends from each side of the fuselage, this frame being preferably formed of the trusses 5' shown in Fig. 11 and to the outer end of the frame 5 is secured a pair of tubular rings 6 which form an exterior race for the roller bearings 7, the inner race of which is also formed of the pair of tubular rings 8 which are fastened to the annular rotatable member 9 to which the supporting ring 10 is connected.

A ring gear 11 is connected to the interior circumference of this member 9 and a pinion 12 meshes with the ring gear, and has a shaft 13 supported by bearings 14 carried by a frame 15 supported in each frame 5. A worm gear 16 is connected with the shaft 13 and meshes with a worm 17 on the shaft of a turbine 18 supported in the frame 5, and having the pipes 19 and 20 connected therewith.

Thus it will be seen that the turbines 18 will cause the pinion 12 through the engagement with the ring gears 11 to rock the members 9 in the ends of the frames 5 to tilt the supporting ring 10 on a horizontal axis. This ring 10 is composed of the pair of upper races 10' and a pair of lower races 10" and connecting members 10a. An upper ring 21 and a lower ring 22 are each composed of the races 23 and the connecting members 24 and ball bearings 25 are placed between the races of the upper and lower rings and the races of the supporting ring 10. Thus the rings 21 and 22 are supported for rotary movement on the ring 10.

The upper ring 21 carries the radiating blades 26 while the lower ring 22 carries the radiating blades 27, the blades 26 being longer than the blades 27. The shorter blades or wings are covered with any suitable material for their full length, while the long blades or wings are covered about one third of their length as shown at 26' in Fig. 1.

An annular rack 28 is connected to the lower edge of the ring 21 and a similar rack 29 is connected to the upper edge of the ring 22. A number of turbines 30 and 31 are supported by the supporting ring 10, and each turbine has a pinion 32 on its shaft, the pinions of the turbines 30 meshing with the teeth of the rack 28 of the ring 21 and the pinion of the turbines 31 meshing with the teeth of the rack 29 of the lower ring 22.

A fluid pump 33 is operated by a motor 34, these members being located in the fuselage, and a pressure sump 35 is located in the pipe line 36 leading from the outlet of the pump and a vacuum sump 37 is located in the pipe line 38 connected with the inlet of the pump. The line 36 connects with a manifold 39 and the line 38 connects with a manifold 40. A pipe line 41 connects the manifold 39 with the turbines 30 for operating the upper ring 21 and a branch line 41 conducts the fluid after passing through the turbines back into the manifold 40 from which it passes through the line 38 and the sump 37 back into the pump.

Figure 3:
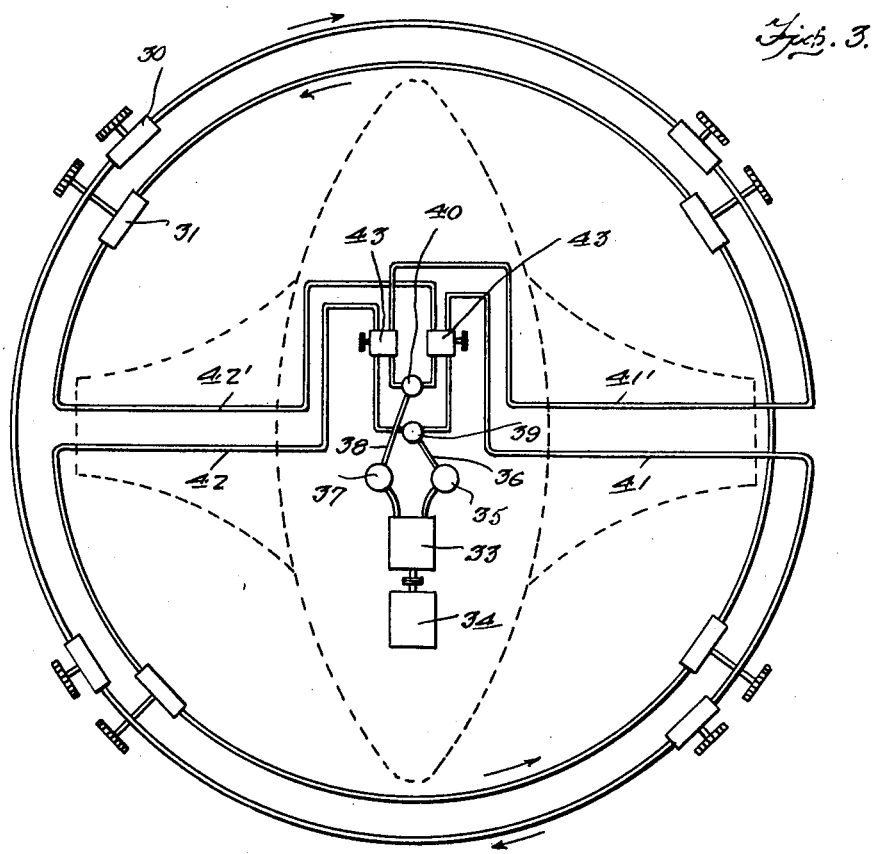
Fig. 3 is a diagrammatic view showing the means for supplying fluid to the turbine which rotates the blade carrying rings.
Figure 5:
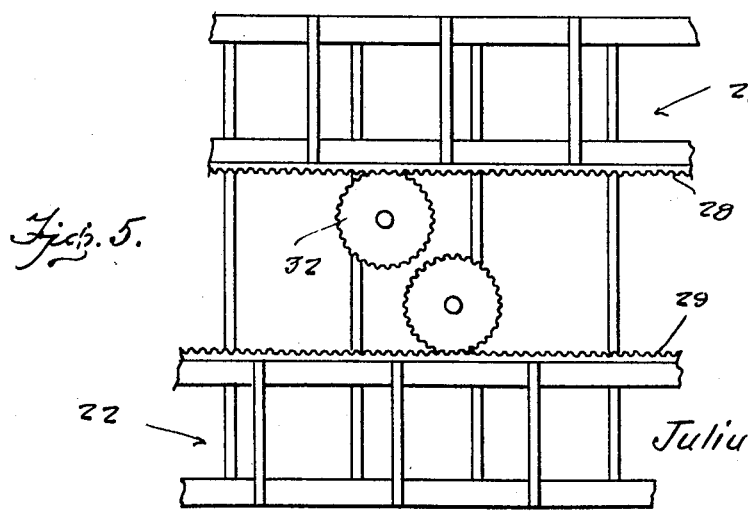
Fig. 5 is a detail view showing the gears of the turbine engaging the racks of the rotary rings.

A pipe line 42 conducts fluid from the manifold 39 to the turbines 31 which drive the lower ring 22, and as will be seen in Fig. 3, the line 42 conducts the fluid in an opposite direction from that in which the line 41 conducts the fluid to the turbines 30, so that the turbines 30 are rotated in a different direction from the turbines 31 and thus the ring 21 is rotated in an opposite direction from that in which the ring 22 is rotated.

A branch 42' leads the fluid after passage through the turbines 31 back to its manifold 40 from which it passes back into the pump.

Valves 43 control the flow of fluid through the pipe lines and each valve is operated by a worm 44 on a shaft 45 engaging a worm gear 46 on the shaft 47 of the valve. Each shaft 45 has a handle 48 at its upper end so that the valve can be adjusted for turning the shaft 45 by means of the handle 48 or the two valves can be operated in unison through means of a hand wheel 49 fastened to a shaft 50 having worms 51 at its ends to engage worm gears 52 on the shafts 45. This shaft 50 is journalled in a frame 53 pivoted at its lower end into brackets 54 so that by swinging the frame 53 outwardly, the worms 51 will be moved out of engagement with the gears 52 to permit the shafts 45 to be operated independent of each other through means of the handles 48. When it is desired to operate the gears 43 simultaneouly this can be done by placing the worms 51 in engagement with gears 52 by swinging the frame 53 inwardly and then turning the wheel 49. The frame 53 is held in position with the worms 51 in mesh with the worm gears 52 by the cams 55 on a shaft 56 supported by the brackets 57, the shaft 56 being provided with a handle 58, and each of the gears 52 is provided with the graduation 59 with which a marker 60 is associated so as to facilitate the adjustment of the parts to open or close the valves 43 to the desired extent.

Thus with this arrangement of parts, the valves can be adjusted to cause the turbines to rotate one blade carrying ring faster than the other and after the adjustment has been made, the parts can be moved simultaneously by the hand wheel 49 so as to vary the speed of rotation of the two blade carrying members, but still cause one blade carrying ring to rotate faster than the other.

It will of course be understood that by adjusting the shafts 45 to the same extent and then using the handle wheel 49 the speed of the two rings can be varied but both rings 21 and 22 will rotate at the same speed.

Each of the pipes 19 and 20 connected with each of the turbines 18 is formed with a branch 19' and 20' as shown in Fig. 12 and the pipes and the branches communicate with a valve 61, these valves controlling the flow of fluid to and from the pipe and the branches and to and from the manifolds 62 and 63. A pipe 64 connecting the manifold 62 to the manifold 40, and a pipe 65 connecting the manifold 63 to the manifold 39 so that the pump 33 provides compressed fluid for the turbines 18 as well as the turbine which rotates the rotary rings.

Rotary members in the valves 61 are connected to a shaft 66 which has a worm gear 67 thereon with which meshes the worm 68 on a shaft 69 which has a handle 70 at its upper end, which shaft 69 carries a marker 71 which cooperates with a graduating member or dial 72 thus facilitating the proper adjustment of the rotary members in the valves 61.

As will be seen from Fig. 12, the valves not only provide means for regulating the tilting movement imparted to the supporting ring 10 by the turbines 18, but they also provide means for causing the fluid to enter the turbines in such a direction so that the turbine will tilt the supporting ring in either one direction or the other according to the adjustment of the valves.

From the foregoing it will be seen that as the blades or wings of one set are traveling in an opposite direction from the blades or wings of the other set, each set counteracts the other and as the blades are set at an angle of incidence while rotating at sufficient speed, gravity is overcome and the craft leaves the ground. By slowing up the rotary movement of one set of wings, the craft will swing in one direction through centrifugal force set up by the other set and by speeding up one set of wings, the ship will turn away from its straight line or passage of flight, due to the centrifugal force of rotation of the faster moving set of wings.

I have also arranged that the right hand shaft 45 so controls the parts, that when this is manipulated, the craft turns to the right and when the left hand control shaft is manipulated, the craft turns to the left. After the parts are adjusted the valves can be controlled by the wheel 49 so as to impart varying speed to the two sets of wings or blades which is desirable, where a strong wind is blowing.

A simultaneous movement of the valves by the wheel 49 is also desirable in landing, and in taking off. It will also be understood that the ship can be guided by tilting the supporting ring which supports the power wing carrying rings.

It will also be understood that rigid pipes or tubes are used throughout except where the tubes at the trunnions are connected with the tubes on the rings where the connections are made by flexible tubes in order to permit tilting movement of the supporting ring, without interfering with the flow of fluid to the turbines on said supporting ring. Each member 9 is connected to the supporting ring 10 by a plurality of tubes *a* which have their outer ends connected to the ring *a'* on the ring 10, and braces *b* connect the tubes *a* with the ring *b'* on the ring 10.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. An aircraft of the class described comprising a fuselage, a supporting ring surrounding the same and supported therefrom for tilting movement about a horizontal axis, upper and lower rings rotatably supported by the supporting ring, outwardly extending radiating blades or wings carried by each rotary ring, means for rotating the rotary rings and means for tilting the supporting ring about its horizontal axis.

2. An aircraft of the class described comprising a fuselage, a supporting ring surrounding the same and supported therefrom for tilting movement about a horizontal axis, upper and lower rings rotatably supported by the supporting ring, outwardly extending radiating blades or wings carried by each rotary ring, means for rotating the rotary rings and means for tilting the supporting ring about its horizontal axis, the wings or blades of one set being of greater length than those of the other set.

3. An aircraft of the class described comprising a fuselage, a supporting ring surrounding the same and supported therefrom for tilting movement about a horizontal axis, upper and lower rings rotatably supported by the supporting ring, radiating blades or wings carried by each rotary ring, means for rotating the rotary ring and means for tilting the supporting ring about its horizontal axis, the wings or blades of one set being of greater length than those of the other set, said operating means consisting of turbines and power means in the fuselage for supplying compressed fluid to the turbines.

4. An air craft of the class described comprising a fuselage, a supporting ring surrounding the same and supported for tilting movement therefrom about a horizontal axis, upper and lower rings supported for rotary movement by the supporting ring, a plurality of blades or wings carried by each rotary ring, a rack on each rotary ring, turbines having pinions on their shafts for engaging the rack of one ring, a second set of turbines having pinions on their shafts engaging the rack of the other rotary ring, power means in the fuselage for supplying compressed fluid to the turbines, the turbine for one ring operating the ring in one direction and those for the other ring, operating said ring in the opposite direction, valve means for controlling the flow of fluid to the turbines, manually operated means for adjusting each valve independently of the other valve, and means for adjusting both valves simultaneously when desired.

5. An aircraft of the class described comprising a fuselage, a supporting ring surrounding the fuselage and supported therefrom for movement about a horizontal axis, turbines for tilting the ring about its horizontal axis, power means within the fuselage for furnishing fluid to the turbines, valves for controlling the flow of fluid to the turbine, manually operated means for adjusting the valves to control the amount of movement of the turbines and also to the direction of movement of the turbine, upper and lower rotary rings supported by the supporting ring, a plurality of wings carried by each rotary ring, turbines for rotating the rings, means for conducting fluid from the power means to the last-mentioned turbines, and means for controlling the flow of fluid to said last-mentioned turbines to regulate the speed of the rotary rings, and to rotate one ring in an opposite direction from that of the other.

In testimony whereof I affix my signature.

JULIUS LEFFERT.